US006307278B1

(12) United States Patent
Nims et al.

(10) Patent No.: US 6,307,278 B1
(45) Date of Patent: Oct. 23, 2001

(54) MICROTURBINE POWER GENERATING SYSTEM

(75) Inventors: Robert A. Nims, Rancho Palos Verdes; Joseph Denk, Manhattan Beach; Ramesh Doshi, La Palma; Terence Emerson, Hermosa Beach, all of CA (US)

(73) Assignee: Honeywell Power Systems Inc., Albuquerque, NM (US)

( * ) Notice: Subject to any disclaimer, the term of this patent is extended or adjusted under 35 U.S.C. 154(b) by 0 days.

(21) Appl. No.: 09/659,627

(22) Filed: Sep. 12, 2000

Related U.S. Application Data

(63) Continuation of application No. 08/995,462, filed on Dec. 20, 1997.
(51) Int. Cl.[7] .................................................. F02C 7/08
(52) U.S. Cl. .......................... 290/52; 60/39.511; 310/156
(58) Field of Search ............................ 290/52; 310/156, 310/51, 75 D; 415/173.3; 60/39.511

(56) References Cited

U.S. PATENT DOCUMENTS

| 4,213,297 | * | 7/1980 | Forster et al. | 60/39.51 R |
| 5,855,112 | * | 1/1999 | Bannai et al. | 60/39.511 |
| 5,964,663 | | 10/1999 | Stewart et al. | 464/98 |
| 6,037,687 | | 3/2000 | Stewart et al. | 310/75 D |
| 6,155,780 | * | 12/2000 | Rouse | 415/173.3 |

FOREIGN PATENT DOCUMENTS

WO97/09524 * 3/1997 (WO).

* cited by examiner

Primary Examiner—Nicholas Ponomarenko
(74) Attorney, Agent, or Firm—Ephraim Starr; John R. Rafter

(57) ABSTRACT

A rotating group for a microturbine power generation system includes an electrical generator rotor, a turbine and a compressor intermediate the generator and the turbine. The turbine, compressor and electrical generator rotor are secured together by a tieshaft. The tieshaft is prestressed such that faces of the turbine, electrical generator rotor and compressor maintain contact during high-speed, high-temperature operation of the system.

35 Claims, 2 Drawing Sheets

MICROTURBINE POWER GENERATING SYSTEM

CROSS-REFERENCE TO RELATED APPLICATIONS

This application is a continuation application that relates to and claims priority Ser. No. 08/995,462, filed on Dec. 20, 1997, which is incorporated herein by reference and which is commonly assigned with the present application.

BACKGROUND OF THE INVENTION

The present invention relates generally to microturbine power generating systems. More specifically, the present invention relates to modular, distributed power generating units.

The United States Electric Power Research Institute (EPRI) which is the uniform research facility for domestic electric utilities, predicts that up to 40% of all new generation could be provided by distributed generators by the year 2006. In many parts of the world, the lack of electric infrastructure (transmission and distribution lines) will greatly expedite the commercialization of distributed generation technologies since central plants not only cost more per kilowatt, but also must have expensive infrastructure installed to deliver the product to the consumer.

Small, multi-fuel, modular distributed microturbine generation units could help alleviate current afternoon "brown-outs" and "blackouts" prevalent in many parts of the world. A simple, single moving part concept would allow for low technical skill maintenance and low overall cost would allow for widespread purchase in those parts of the world where capital is sparse. In addition, given the United States emphasis on electric deregulation and the world trend in this direction, consumers of electricity would have not only the right to choose the correct method of electric service, but also a new cost effective choice from which to chose. U.S. Pat. No. 4,754,607, which is assigned to the assignee of the present invention, discloses a microturbine power generating system suitable for cogeneration applications.

Yet to make these units commercially attractive to consumers, improvements are needed in areas such as increasing fuel-efficiency, reducing size and weight, and lowering thermal signature, noise, maintenance and cost penalties.

SUMMARY OF THE INVENTION

The invention can be regarded as a microturbine power generating system including an electrical generator and a turbine that can be rotated by a single shaft. Hot, expanding gases resulting from the combustion are expanded through a turbine, and the resulting turbine power generated by the turbine is used for powering the electrical generator. The microturbine power generating system further includes a single shaft connecting the turbine and electrical generator in prestressed relation to allow the electrical generator to rotate in unison with the turbine and to thereby use the mechanical energy extracted by the turbine to produce power.

Electricity production of the system is especially flexible. A variable-frequency ac output produced by the electrical generator can be rectified to dc power. The dc power can then be chopped by an inverter to produce ac power having a selected frequency.

DETAILED DESCRIPTION

Figure 1:
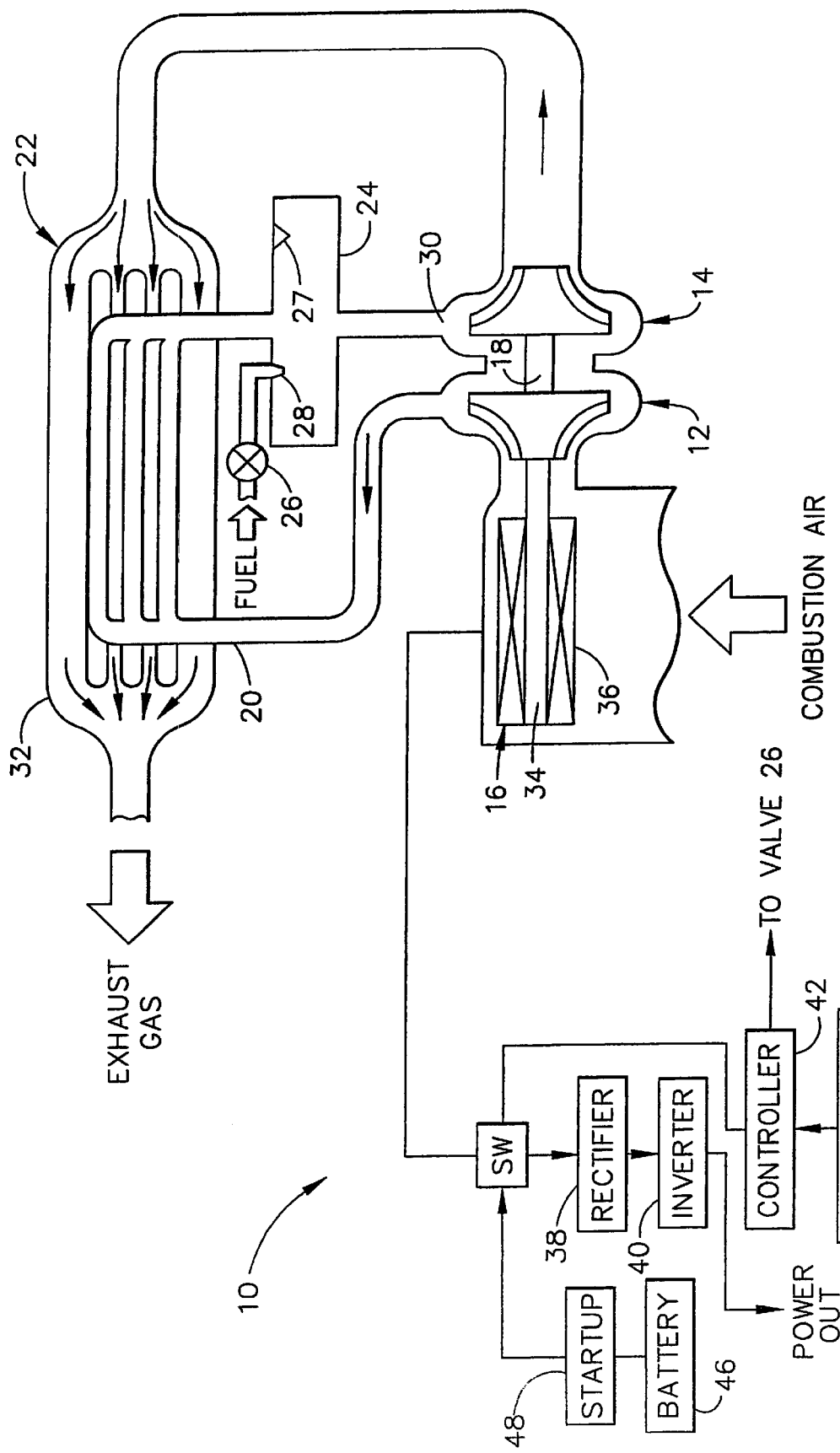
FIG. 1 is a block diagram of a power generating system according to the present invention.

Referring to FIG. 1, a power generating system 10 according to the present invention is illustrated. The power generating system 10 includes a compressor 12, a turbine 14 and an electrical generator 16. The electrical generator 16 is cantilevered from the compressor 12. The compressor 12, the turbine 14 and the electrical generator 16 can be rotated by a single shaft 18. Although the compressor 12, turbine 14 and electrical generator 16 can be mounted to separate shafts, the use of a single common shaft 18 for rotating the compressor 12, the turbine 14 and the electrical generator 16 adds to the compactness and reliability of the power generating system 10.

Figure 2:
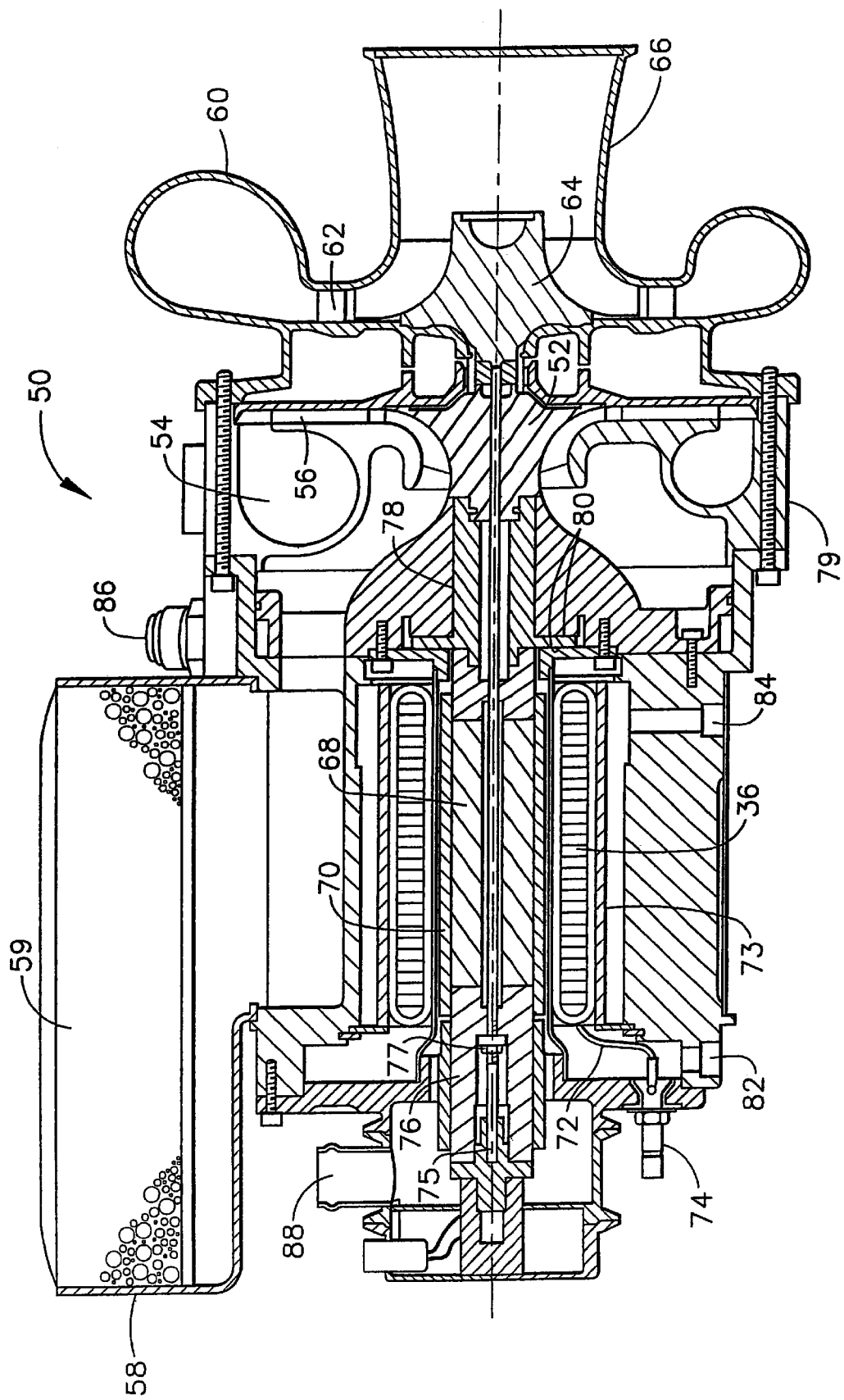
FIG. 2 is a cross-section view of an engine core for the power generating system.

The shaft 18 can be supported by self-pressurized air bearings such as foil bearings. As is shown in FIG. 2, the shaft 18 is supported by journal foil bearings 76 and 78 and thrust foil bearings 80. The foil bearings eliminate the need for a separate bearing lubrication system and reduce the occurrence of maintenance servicing.

Air entering an inlet of the compressor 12 is compressed. Compressed air leaving an outlet of the compressor 12 is circulated through cold side passages 20 in a cold side of a recuperator 22. In the recuperator 22, the compressed air absorbs heat, which enhances combustion. The heated, compressed air leaving the cold side of the recuperator 22 is supplied to a combustor 24.

Fuel is also supplied to the combustor 24. Both gaseous and liquid fuels can be used. In gaseous fuel mode, any suitable gaseous fuel can be used. Choices of fuel include diesel, flare gas, off gas, gasoline, naphtha, propane, JP-8, methane, natural gas and other man-made gases.

The flow of fuel is controlled by a flow control valve 26. The fuel is injected into the combustor 24 by an injection nozzle 28.

Inside the combustor 24 the fuel and compressed air are mixed and ignited by an igniter 27 in an exothermic reaction. In the preferred embodiment, the combustor 24 contains a suitable catalyst capable of combusting the compressed, high temperature, fuel-air mixture at the process conditions. Some known catalysts usable in the combustor 24 include platinum, palladium, as well as metal oxide catalyst with active nickel and cobalt elements.

After combustion, hot, expanding gases resulting from the combustion are directed to an inlet nozzle 30 of the turbine 14. The inlet nozzle 30 has a fixed geometry. The hot, expanding gases resulting from the combustion is expanded through the turbine 14, thereby creating turbine power. The turbine power, in turn, drives the compressor 12 and the electrical generator 16.

Turbine exhaust gas is circulated by hot side passages 32 in a hot side of the recuperator 22. Inside the recuperator 22, heat from the turbine exhaust gas on the hot side is transferred to the compressed air on the cold side. In this manner, some heat of combustion is recuperated and used to raise the temperature of the compressed air en route to the combustor 24. After surrendering part of its heat, the gas exits the recuperator 22. Additional heat recovery stages could be added onto the power generating system 10.

The generator 16 can be a ring-wound, two-pole toothless (TPTL) brushless permanent magnet machine having a permanent magnet rotor 34 and stator windings 36. The turbine power generated by the rotating turbine 14 is used to rotate the rotor 34. The rotor 34 is attached to the shaft 18. When the rotor 34 is rotated by the turbine power, an alternating current is induced in the stator windings 36. Speed of the turbine can be varied in accordance with external energy demands placed on the system 10. Variations in the turbine speed will produce a variation in the frequency of the alternating current (i.e., wild frequencies) generated by the electrical generator 16. Regardless of the frequency of the ac power generated by the electrical generator 16, the ac power can be rectified to dc power by a rectifier 38, and then chopped by a solid-state electronic inverter 40 to produce ac power having a fixed frequency. Accordingly, when less power is required, the turbine speed can be reduced without affecting the frequency of the ac output.

Moreover, reducing the turbine speed reduces the airflow because the compressor runs slower. Consequently, the turbine inlet temperature remains essentially constant, thus maintaining a high efficiency at part load.

Use of the rectifier 38 and the inverter 40 allows for wide flexibility in determining the electric utility service to be provided by the power generating system of the present invention. Because any inverter 40 can be selected, frequency of the ac power can be selected by the consumer. If there is a direct use for ac power at wild frequencies, the rectifier 38 and inverter 40 can be eliminated.

The power generating system 10 can also include a battery 46 for providing additional storage and backup power. When used in combination with the inverter 40, the combination can provide uninterruptible power for hours after generator failure. Additionally, the controller causes the battery 46 to supply a load when a load increase is demanded. The battery 46 can be sized to handle peak load demand on the system 10.

During operation of the power generating system 10, heat is generated in the electrical generator 16 due to inefficiencies in generator design. In order to extend the life of the electrical generator 16, as well as to capture useful heat, compressor inlet air flows over the generator 16 and absorbs excess heat from the generator 16. The rectifier 38 and the inverter 40 can also be placed in the air stream. After the air has absorbed heat from the aforementioned sources, it is compressed in the compressor 12 and further pre-heated in the recuperator 22.

A controller 42 controls the turbine speed by controlling the amount of fuel flowing to the combustor 24. The controller 42 uses sensor signals generated by a sensor group 44 to determine the external demands upon the power generating system 10. The sensor group 44 could include sensors such as position sensors, turbine speed sensors and various temperature and pressure sensors for measuring operating temperatures and pressures in the system 10. Using the aforementioned sensors, the controller 42 controls both startup and optimal performance during steady state operation. The controller 42 can also determine the state of direct current storage in the battery 46, and adjust operations to maintain conditions of net charge, net drain, and constant charge of the battery.

A switch/starter control 48 can be provided off-skid to start the power generating system 10. Rotation of the compressor 12 can be started by using the generator 16 as a motor. During startup, the switch/starter control 48 supplies an excitation current to the stator windings 36 of the electrical generator 16. Startup power is supplied by the battery 46. In the alternative, a compressed air device could be used to motor the power generating system 10.

Referring to FIG. 2, the "engine core" 50 of the power generating system 10 is shown. The compressor 12 includes an impeller 52 having a bore, a compressor scroll 54 and a diffuser channel 56. Air entering an air inlet 58 is filtered by an air filter 59 and directed to the compressor scroll 54. Air flowing out of the compressor scroll 54 is directed to the recuperator 22.

The turbine 14 includes a turbine scroll 60, a plurality of fixed nozzle vanes 62, and a boreless turbine wheel 64. Hot expanding gases leaving the combustor 24 are directed into the turbine scroll 60 and through the nozzle vanes 62, which redirect the hot expanding gas onto the turbine wheel 64. Turbine exhaust gas leaves the turbine 14 through an exhaust diffuser 66, which reduces the temperature and noise of the turbine exhaust gas.

The rotor 34 of the electrical generator 16 includes magnets 68 made of a rare earth material such as samarium cobalt. The magnets 68 are surrounded by a containment sleeve 70 made of a non-magnetic material such as Inconel 718. The stator windings 36 are housed in a generator housing 73. The rotor 34 has a bore and an optional containment sleeve (not shown) contacting a surface of the bore. Power conductors 72 extend from the stator windings 36 and terminate in a power connector stud 74, which is secured to a base 79. The base 79 provides support for a fuel inlet, the air inlet 58, the compressor 12, the turbine 14, the generator 16, the recuperator 22, the combustor 24, the rectifier 38, and the inverter 40, to enable the system 10 to exist as a packaged unit.

The single shaft 18 is shown in FIG. 2 as a tieshaft 75, which extends through the bores in the rotor 34 and the compressor impeller 52. The tieshaft 75 is thin, having a diameter of approximately 0.25 inches to 0.5 inches. The bores have clearances that allow the tieshaft 75 to extend through the rotor 34 and the impeller 52. However, the tieshaft 75 does not extend through the turbine wheel 64. Instead, the tieshaft 75 is secured to the turbine wheel 64. The tieshaft 75 can be secured to the center of the turbine wheel hub by an inertia weld. Thus, the turbine wheel 64 is boreless in that it does not have a bore through which the tieshaft 75 extends. Eliminating the bore reduces stresses in the turbine wheel 64.

When clamped together by the tieshaft 75, the compressor impeller 52, the turbine wheel 64 and the rotor 34 are rotated as a single unit. Under high operating temperatures and rotational speeds, however, the impeller 52, the turbine wheel 64 and the rotor 34 tend to expand and grow apart and their faces tend to lose contact. Flexing of the tieshaft 75 during operation also tends to separate the faces. To maintain contact between the faces of the impeller 52, the turbine wheel 64 and the rotor 34 at high rotational speeds (60,000 rpm and above), the tieshaft 75 is preloaded. For example, a tieshaft 75 made of Inconel 718 can be preloaded in tension to about 90% of yield strength. During assembly, the tieshaft 75 is preloaded, the impeller 52 and the rotor 34 are slid over the tieshaft 75, and a nut 77 is secured to a threaded end of the tieshaft 75. The tension in the tieshaft 75 is maintained as the nut 77 is turned.

The rotating unit 52, 64, 34 and 75 is supported in a radial direction by inboard and outboard foil journal bearings 76 and 78. The rotating unit 52, 64, 34 and 75 is supported in an axial direction by a foil thrust bearing 80.

Various coolant ports are provided for the engine core 50. Provided are ports 82 and 84 for circulating a coolant over the stator windings 36. Also provided are ports 86 and 88 for circulating a coolant over the foil bearings 76, 78 and 80.

The power generating system 10 can be built in several major modules such as a rotating module, a heat exchanger module, a combustor module, and an electronics module. Each of these modules is relatively lightweight and compact. The modules can be replaced without breaking liquid lines. The use of foil bearings 76, 78 and 80 eliminates the need for an oil-based lubrication system and, therefore, results in low maintenance of the power generating system 10. Scheduled maintenance would consist primarily of replacing the igniter 27, the filter 59 and catalyst elements in the combustor 24.

The power generating system 10 operates on a conventional recuperated Brayton cycle. The Brayton cycle can be operated on a relatively low pressure ratio (e.g., 3.8) to maximize overall efficiency; since, in recuperated cycles, the lower the pressure ratio, the closer the turbine exhaust temperature is to the inlet temperature. This allows heat addition to the cycle at high temperature and, in accordance with the law of Carnot, reduces the entropic losses associated with supplying heat to the cycle. This high temperature heat addition results in an increased overall cycle efficiency.

The values that follow are provided as an example. Air is compressed in a single stage radial compressor to 3.8 bars. The compressed air can be directed to the recuperator 22 where the temperature of the compressed air is increased using the waste heat from the turbine exhaust gas. The temperature of the exhaust gas from the turbine is limited to about 1,300° F. In order to help extend the life of the recuperator 22. For exhaust gas temperatures above 1,300° F., the recuperator 22 can be made of super alloys instead of stainless steel. The recuperator 22 can be designed for either 85% or 90% effectiveness depending on the economic needs of the customer. In the most efficient configuration, and using the 90% recuperation, the overall net cycle efficiency is 30%, yielding a high heating value heat rate of approximately 11,900 BTU/kWh on diesel.

After being heated in the recuperator 22, the compressed air is directed to the combustor 24, where additional heat is added to raise the temperature of the compressed air to 1,650° F. A combustor 24 designed according to a conventional design can yield a NOx level of less than 25 ppm, and a combustor 24 using a catalyst can yield a NOx rate that is virtually undetectable (commercial NOx sensors are limited to a 2 to 3 ppm detection range). The high enthalpic gas is then expanded through the turbine 14. The impeller 52, the turbine wheel 64, the rotor 34, and the tieshaft 75—the only moving parts in the engine core 50—spin as a single unit at high speeds of approximately 60,000 rpm or more. The resulting generator output frequency of around 1,200 hertz is then reduced by the inverter 40 to a grid-compatible 50 or 60 cycles. Resulting is a high power density typified by low weight (about a third of the size of a comparable diesel generator) and a small footprint (for example, approximately 3 feet by 5 feet by 6 feet high).

The high power density and low weight of the technology is made possible through the high speed components which permits large amounts of power using a minimum of material.

The power generating system 10 is "plug and play", requiring little more than a supply of clean fuel, liquid or gas.

Thus disclosed is a power generating system 10 that can use multiple fuels including natural gas, diesel and JP-8. The power generating system 10 has a low thermal signature and minimal noise generation. The use of air bearings (including foil bearings) eliminates the need for an oil-based lubrication system. The electrical generation system 10 has high reliability and minimal service requirements due to single moving part design. The use of a solid-state electronic inverter allows the system 10 to provide a variable AC output. Installation is easy due to a modular and self-contained design, and servicing is easy because the system 10 has one moving part and major parts that are easily accessible. The width, length and height of the engine core 50 can be adjusted to fit a wide variety of dimensional requirements.

The power generating system 10 is smaller, lighter, more fuel-efficient and has lower thermal signature, noise, maintenance and cost penalties than comparable internal combustion engines. Therefore, due to its low installation costs, high efficiency, high reliability and simple, low cost maintenance, the power generating system 10 provides lower operating and fixed costs than power generators of comparable size.

Potential applications for the power generating system 10 are many and diverse. Applications include use in off-grid applications for standalone power, on-grid applications for peak shaving, load following or base load service, emergency back-up and uninterruptible power supply, prime mover applications (e.g., pump, air conditioning) and automotive hybrid vehicles.

The invention is not limited to the specific embodiments disclosed above. For example, the present invention could be configured without the electrical generator 16. Turbine power would be transmitted and applied directly, as in the case of a mechanically driven refrigeration system. Therefore, the present invention is construed according to the claims that follow.

What is claimed is:

1. A rotating group for a microturbine power generating system, comprising:

a turbine wheel receiving expanding gas, the expanding gas causing the turbine wheel to rotate about an axis;

a rotor having at least one rotor surface and a rotor bore concentric with the axis, at least a portion of said rotor being magnetic, wherein said at least one rotor surface is adapted for rotation within at least one foil journal bearing;

a single tieshaft having a diameter of less than about one-half inch, the tieshaft being concentric with the axis and extending through the rotor bore, the tieshaft having a yield strength and being preloaded in tension to a predetermined percentage of said yield strength; and means for maintaining the tension in the tieshaft and securing said rotor and said turbine wheel to rotate in unison with the tieshaft.

2. A rotating group for a microturbine power generating system according to claim 1, further comprising:

an impeller wheel having an impeller bore concentric with the axis, the tieshaft further extending through the impeller bore; and means for securing said impeller wheel to rotate in unison with the tieshaft.

3. The rotating group of claim 2, wherein the rotor has inner and outer sleeves, the outer sleeve being non-magnetic and surrounding the magnetic portion of the rotor, the inner sleeve surrounding the rotor bore.

4. The rotating group of claim 2, wherein the turbine wheel is boreless.

5. A rotating group for a microturbine power generating system according to claim 4, wherein the tieshaft is secured to the turbine wheel by an inertia weld.

6. A rotating group for a microturbine power generating system according to claim 1, further comprising:

at least one thrust disk extending concentrically from the rotor, adapted for rotation between at least two foil thrust bearings.

7. A rotating group for a microturbine power generating system according to claim 6, wherein the at least one rotor surface adapted for rotation within at least one foil journal bearing comprises first and second rotor surfaces located on opposite sides of the magnetic portion of the rotor and adapted for rotation within first and second foil journal bearings.

8. A rotating group for a microturbine power generating system according to claim 6, wherein the at least one thrust disk comprises one thrust disk located between the rotor and the turbine wheel.

9. A rotating group for a microturbine power generating system according to claim 3, wherein the impeller wheel is positioned between the rotor and the turbine wheel, and the at least one rotor surface adapted for rotation within at least one foil journal bearing comprises first and second rotor surfaces located on opposite sides of the magnetic portion of the rotor and adapted for rotation within first and second foil journal bearings, further comprising:
a thrust disk extending concentrically from the rotor between the magnetic portion of the rotor and the impeller wheel, adapted for rotation between two foil thrust bearings.

10. A rotating group for a microturbine power generating system according to claim 9, wherein the turbine wheel is boreless.

11. A rotating group for a microturbine power generating system according to claim 1, wherein the predetermined percentage of said yield strength is about 90%.

12. A rotating group for a microturbine power generating system according to claim 10, wherein the predetermined percentage of said yield strength is about 90%.

13. A rotating group for a microturbine power generating system, comprising:
a turbine wheel, a compressor wheel, a rotor, and a single tieshaft, each of said turbine wheel, compressor wheel, rotor, and single tieshaft having a common axis and being secured in fixed relation relative to each other, wherein:
said rotor includes (a) a rotor bore concentric with the axis, (b) a magnetic portion comprising a two-pole permanent magnet, and (c) at least one rotor surface adapted for rotation within at least one foil journal bearing; and
said single tieshaft extends through the rotor bore.

14. A rotating group for a microturbine power generating system according to claim 13, wherein said compressor wheel has a compressor wheel bore concentric with the axis and said single tieshaft extends through the compressor wheel bore.

15. A rotating group for a microturbine power generating system according to claim 14, wherein the at least one rotor surface adapted for rotation within at least one foil journal bearing comprises first and second rotor surfaces located on opposite sides of the magnetic portion of the rotor and adapted for rotation within first and second foil journal bearings.

16. A rotating group for a microturbine power generating system according to claim 15, further comprising a thrust disk extending concentrically from the rotor between the magnetic portion of the rotor and the compressor wheel and adapted for rotation between two foil thrust bearings.

17. A rotating group for a microturbine power generating system according to claim 13, wherein the rotor has an outer containment sleeve made of a non-magnetic material and surrounding the magnetic portion of the rotor.

18. A rotating group for a microturbine power generating system according to claim 16, wherein the rotor has an outer containment sleeve made of a non-magnetic material and surrounding the magnetic portion of the rotor.

19. A rotating group for a microturbine power generating system according to claim 13, wherein the rotor has inner and outer sleeves, the outer sleeve being non-magnetic and surrounding the magnetic portion of the rotor, the inner sleeve surrounding the rotor bore.

20. A rotating group for a microturbine power generating system according to claim 16, wherein the rotor has inner and outer sleeves, the outer sleeve being non-magnetic and surrounding the magnetic portion of the rotor, the inner sleeve surrounding the rotor bore.

21. A rotating group for a microturbine power generating system according to claim 17, wherein the two-pole permanent magnet includes magnets made of a rare earth material selected from the group that includes samarium cobalt.

22. A rotating group for a microturbine power generating system according to claim 18, wherein the two-pole permanent magnet includes magnets made of a rare earth material selected from the group that includes samarium cobalt.

23. A rotating group for a microturbine power generating system according to claim 19, wherein the two-pole permanent magnet includes magnets made of a rare earth material selected from the group that includes samarium cobalt.

24. A rotating group for a microturbine power generating system according to claim 20, wherein the two-pole permanent magnet includes magnets made of a rare earth material selected from the group that includes samarium cobalt.

25. A rotating group for a microturbine power generating system, comprising:
a turbine wheel, a compressor wheel, a rotor, and a single tieshaft, each of said turbine wheel, compressor wheel, rotor, and single tieshaft having a common axis and being secured in fixed relation relative to each other, wherein:
said rotor includes (a) a rotor bore concentric with the axis, and (b) a magnetic portion comprising a two-pole permanent magnet; and
said single tieshaft extends through the rotor bore.

26. A rotating group for a microturbine power generating system according to claim 25, wherein said compressor wheel has a compressor wheel bore concentric with the axis and said single tieshaft extends through the compressor wheel bore.

27. A rotating group for a microturbine power generating system according to claim 25, wherein the rotor has an outer containment sleeve made of a non-magnetic material and surrounding the magnetic portion of the rotor.

28. A rotating group for a microturbine power generating system according to claim 27, wherein the two-pole permanent magnet includes magnets made of a rare earth material selected from the group that includes samarium cobalt.

29. A rotating group for a microturbine power generating system according to claim 25, wherein the rotor has inner and outer sleeves, the outer sleeve being non-magnetic and surrounding the magnetic portion of the rotor, the inner sleeve surrounding the rotor bore.

30. A rotating group for a microturbine power generating system according to claim 29, wherein the two-pole permanent magnet includes magnets made of a rare earth material selected from the group that includes samarium cobalt.

31. A rotating group for a microturbine power generating system, comprising:

a turbine wheel receiving expanding gas, the expanding gas causing the turbine wheel to rotate about an axis;

an impeller wheel having an impeller bore concentric with the axis;

a rotor having at least one rotor surface and a rotor bore concentric with the axis;

a single tieshaft being concentric with the axis and extending through the impeller bore and the rotor bore; and means for maintaining tension in the tieshaft and securing said impeller wheel, said rotor and said turbine wheel to rotate in unison with the tieshaft, wherein said impeller wheel has a front side, a back side, and impeller vanes, the impeller vanes being disposed on said impeller wheel front side, wherein said turbine wheel has a front side, a back side, and turbine vanes, the turbine vanes being disposed on said turbine wheel front side, and wherein said impeller wheel back side faces said turbine wheel back side.

32. A rotating group for a microturbine power generating system according to claim 31, further comprising:

at least one thrust disk extending concentrically from the rotor, adapted for rotation between at least two foil thrust bearings.

33. A rotating group for a microturbine power generating system according to claim 32, wherein said at least one rotor surface comprises first and second rotor surfaces located on opposite sides of a magnetic portion of the rotor, said first and second rotor surfaces being adapted for rotation within first and second foil journal bearings.

34. A rotating group for a microturbine power generating system according to claim 32, wherein the at least one thrust disk comprises one thrust disk located between the rotor and the turbine wheel.

35. A rotating group for a microturbine power generating system according to claim 31, wherein the impeller wheel is positioned between the rotor and the turbine wheel, wherein the at least one rotor surface comprises first and second rotor surfaces located on opposite sides of a magnetic portion of the rotor, said first and second rotor surfaces being adapted for rotation within first and second foil journal bearings, further comprising:

a thrust disk extending concentrically from the rotor between the magnetic portion of the rotor and the impeller wheel, said thrust disk being adapted for rotation between two foil thrust bearings.

* * * * *